Sept. 15, 1931.  H. A. HUSTED  1,823,563
STEERING WHEEL
Filed Feb. 20, 1929  3 Sheets-Sheet 2

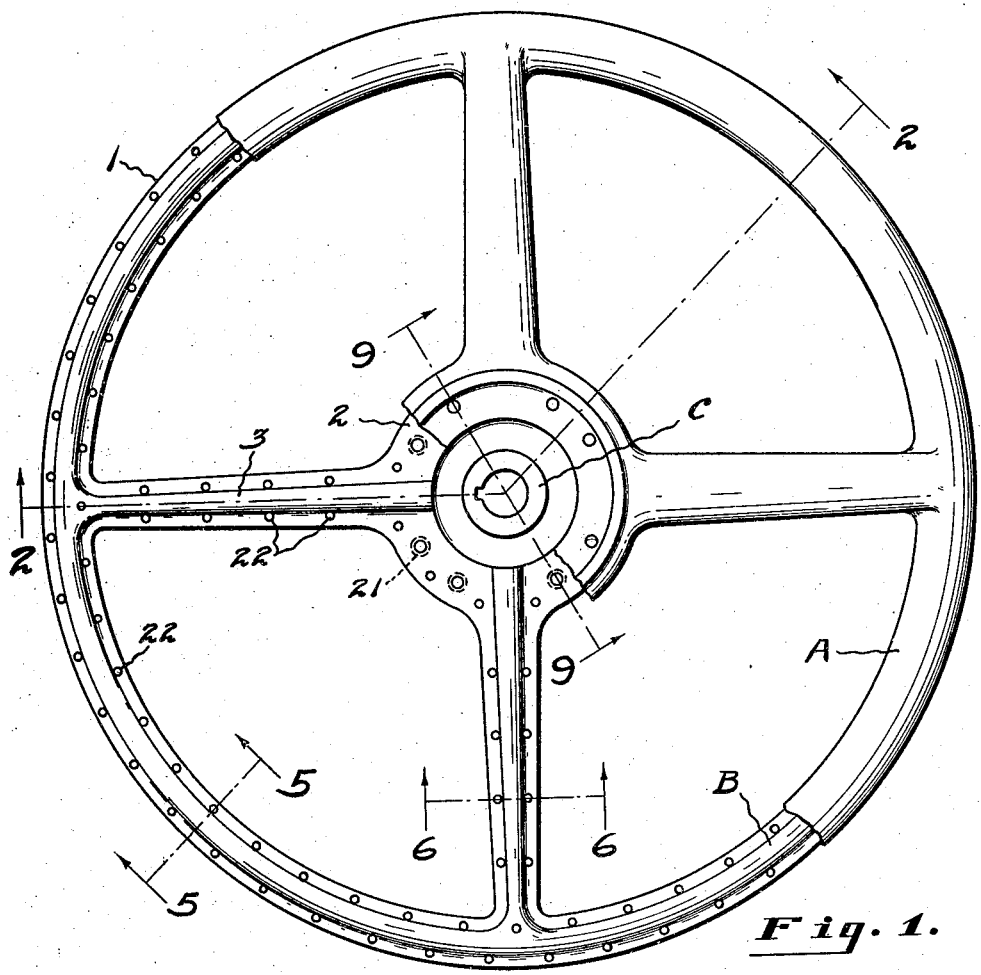
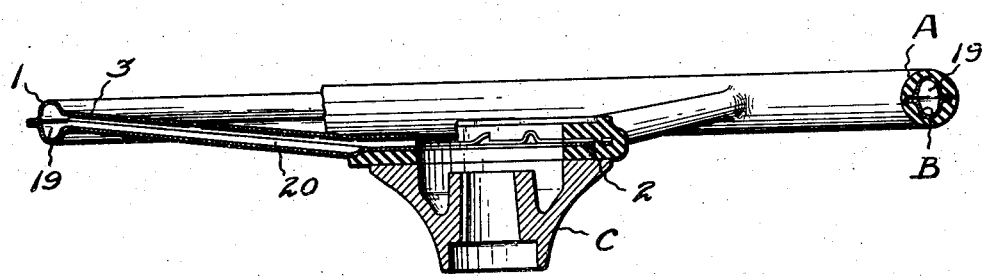

INVENTOR
HARRY A. HUSTED
BY
Evans & McCoy
ATTORNEYS

Sept. 15, 1931.   H. A. HUSTED   1,823,563
STEERING WHEEL
Filed Feb. 20, 1929   3 Sheets-Sheet 3

INVENTOR
HARRY A. HUSTED
BY
Evans + McCoy
ATTORNEYS

Patented Sept. 15, 1931

1,823,563

UNITED STATES PATENT OFFICE

HARRY A. HUSTED, OF CLEVELAND, OHIO, ASSIGNOR TO THE H. A. HUSTED COMPANY, OF DETROIT, MICHIGAN, A CORPORATION OF MICHIGAN

STEERING WHEEL

Application filed February 20, 1929. Serial No. 341,287.

This invention relates to steering wheels and particularly to wheels of the reinforced composition type.

The principal object of the present invention is to provide a reinforced composition steering wheel which is light in weight, rigid in construction, and economical to manufacture.

Another object is to provide a reinforced composition steering wheel wherein a minimum amount of composition material is used to embed the reinforcing spider in order to provide a wheel of suitable dimensions and strength.

Another object is to provide a steering wheel having a reinforcing spider comprising component pressed metal channel sections secured together face to face, and a composition body surrounding said sections.

A further object is to provide a reinforced composition steering wheel having a hollow reinforcing spider embedded in a body of composition material, with means for allowing the escape to the atmosphere of gases formed within said spider during the molding of the composition material about the spider.

A still further object is to provide a reinforced composition steering wheel with a reinforcing spider embedded in a composition body, comprising two pressed metal rim, spoke and hub sections secured together having continuous closed passageways formed between the rims and spokes thereof, the passageways being open to the atmosphere only at the central hub opening of the spider.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a plan view of a reinforced composition steering wheel, a portion of the composition material being broken away to show the reinforcing spider.

Fig. 2 is a section taken on the line 2—2 of Fig. 1 showing the passageways within the reinforcing spider.

Heretofore pressed metal spiders for reinforced composition steering wheels have been proposed which were embedded in a composition body, the reinforcing spider thereof being comparatively small in section in order to reduce the weight of the finished wheel. Consequently considerable composition material was used to form a spider of suitable dimensions. The result of this practice was that the cost of the finished wheel was relatively high because of the quantity of composition material required to embed the spider and provide a wheel of desired dimensions.

Other wheels have been proposed which embody tubular rim elements and pressed or cast metal spokes, the ends of which entered into the tubular rim elements through slots formed therein. Reinforcing spiders of this nature when formed of composition material produced wheels of inferior quality, because it has been found that when the composition material was molded around the reinforcing spider, gases would accumulate within the tubular rim during the molding of the composition material and would suddenly explode to flow out through the slots through which the spokes extended and form gas pockets along the surface of the tubular rim and the composition body. These gas pockets caused a non-homogeneous composition structure, with the result that weak spots or sections were provided in the composition body which were objectionable both from the viewpoint of appearance and strength.

The present invention proposes a steering wheel structure which overcomes these serious disadvantages and provides a reinforced composition wheel which is light in weight, of great strength and which can be economically produced.

Referring to the accompanying drawings in which like numerals refer to like parts throughout the several views, the steering wheel of the present invention as shown in Figs. 1 and 2 principally comprises three elements, a composition body A, a reinforcing spider B embedded therein, and a separately formed hub member C.

Figure 3:
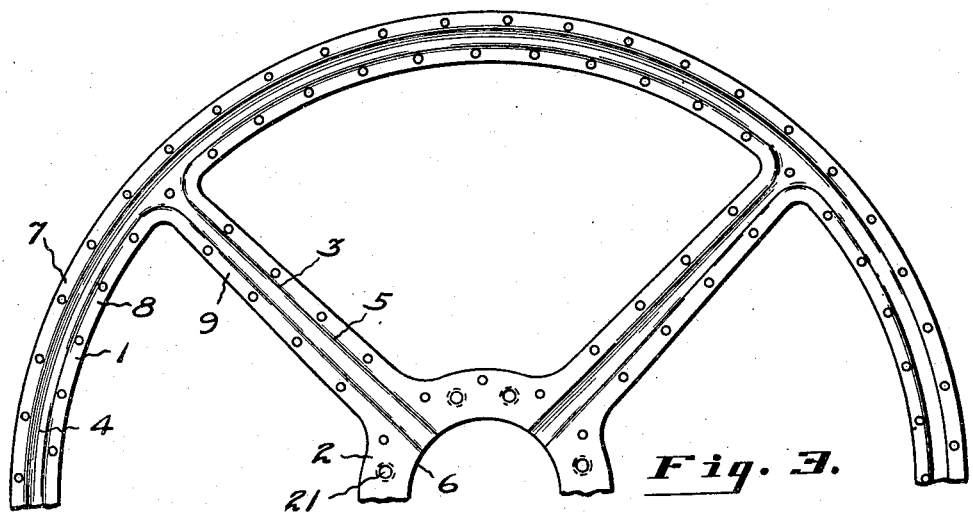
Fig. 3 is a fragmentary plan view of the lower face of the upper reinforcing spider section.

The reinforcing spider B is preferably constructed of an upper section and a lower section. The upper section as shown in Figs. 1, 2 and 3 is formed with a rim 1, a hub annulus 2, and spokes 3 radiating from the hub annulus 2. The rim 1, hub annulus 2 and spokes 3 are preferably formed from a single piece of sheet metal, thereby providing an integral structure wherein the spokes 3 are integral with the rim 1 and hub annulus 2. The rim 1 is formed with a continuous upwardly presenting circumferential groove 4, and the spokes 3 are likewise formed with longitudinal grooves 5 which merge with and are continuous with the rim groove 4 at their outer ends and extend at their inner ends across the body of the hub annulus 2 and terminate at the central hub opening 6. The rim 1 is also formed with a continuous outer flange 7 at the outer edge of the groove 4 and with flanges 8 at the inner edges of the groove 4, and the spokes 3 are formed with side flanges 9 which are continuous with the inner rim flanges 8.

Figure 4:
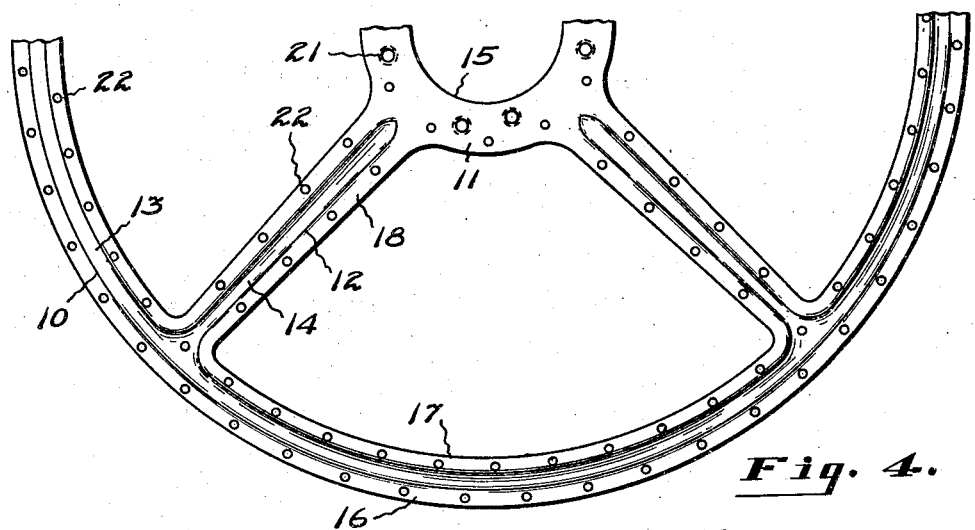
Fig. 4 is a fragmentary plan view of the upper face of the lower reinforcing spider.
Figure 5:
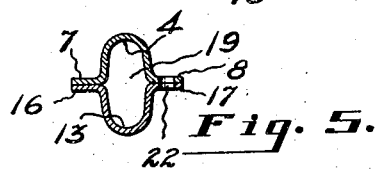
Fig. 5 is an enlarged section of the spider rim taken on the line 5—5 of Fig. 1.
Figure 6:
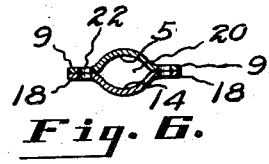
Fig. 6 is an enlarged section of one of the spokes of the spider taken on the line 6—6 of Fig. 1.

The lower reinforcing spider section which is likewise formed with integral rim, hub annulus and spokes 10, 11 and 12 respectively, is provided with a continuous upwardly presenting rim groove 13 and longitudinal spoke grooves 14 which are continuous with the rim groove 13. The inner ends of the spoke grooves 14 do not, however, extend through the web of the hub annulus 2 but terminate at the outer edge of the same, as shown in Figs. 2 and 4. It is to be understood, however, that they may be extended through the hub annulus to the central opening 16 thereof if desired. The rim 10, like the rim 1, is provided with outer and inner flanges 16 and 17, and the spokes 12 are provided with side flanges 18 which are continuous with the inner rim flanges 8 and merge into the web of the hub annulus 15.

The upper and lower sections just described are made of the same size throughout so that when they are assembled together the flanges 7, 8 and 9 of the upper section abut against the flanges 16, 17 and 18 respectively of the lower section, the rim grooves 4 and 13 thereby forming a continuous passageway 19 which is continuous with passageway 20 formed by the grooves 5 and 14 of the spokes of the two sections. It can be seen that the spoke passageways 20 extend over the hub annulus of the lower section and open to the atmosphere at the aligned central hub openings 6 and 15.

The two sections are secured together preferably by spot welding the component flanges together or by screws, rivets and the like. The hub annulæ of the two sections are formed with a plurality of spaced openings 21 for a purpose to be described later in the specification, and the abutting rim flanges, spokes and hub annulæ are provided with a plurality of axial perforations 22 through which the material of the composition body A flows when it is molded around the spider B to integrally unite the same.

Figure 8:
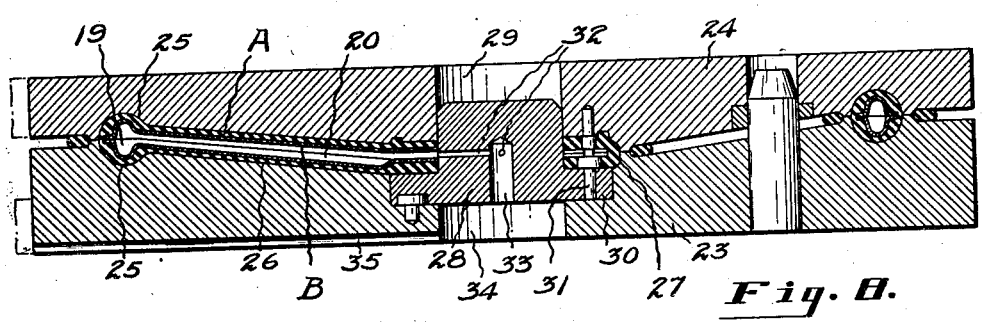
Fig. 8 is a section taken through a mold, showing the reinforcing spider positioned therein, and showing composition material molded around the spider.
Figure 9:
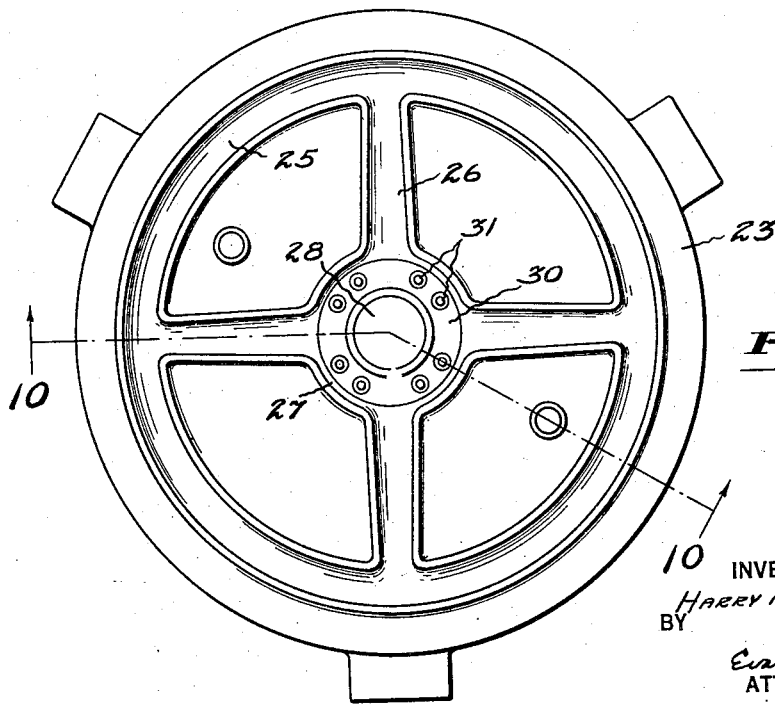
Fig. 9 is a plan view of the lower mold section shown in Fig. 8.

One type of mold for molding the composition material is shown in Figs. 8 and 9 and comprises a lower mold section 23 and an upper mold section 24. Each mold section is provided with rim, hub and spoke depressions 25, 26 and 27 respectively which, when the mold sections are in closed position provide a cavity conforming to the shape of the wheel to be produced. The lower mold section 23 is provided with a central plug 28 which registers with a central opening 29 in the upper section. The plug 28 is formed with a circumferential flange 30 which supports a plurality of double ended pins 31 arranged circumferentially thereof and which have the same spacing as the openings 21 of the spider.

The reinforcing spider B so constructed in the manner just described, is positioned in the lower mold section 23 and is supported by the shoulders of the enlarged portions of the pins 31, the upper ends thereof projecting through the openings 21 of the spider hub annulus. These pins 31 extending through the openings 21 register the spider B in the mold section so that the rim, spokes and hub thereof are correctly spaced within the walls of the cavity of the mold formed by the grooves 25, 26 and 27. The registering plug 28 snugly fits within the opening of the spider hub annulus and is formed with radial passageways 32 which register with the spoke passageway 20 as shown in Fig. 8 and lead to a central axial passageway 33 which opens into the space 34 below the plug 28. The lower mold section 23 is also formed with a recess 35 leading from the space 34 to the atmosphere.

The composition material comprising the composition body A of the wheel and which is positioned in the mold cavities around the spider 8, is subjected to heat and pressure, and is completely molded around and bonded to the spider 8 substantially as shown in Fig. 8, the only exposed portions of the spider being that portion of the hub annulus forming the central opening therein, and the metal adjacent to the openings 21 in the hub annulus. It is readily apparent to one skilled in the art that gases will be produced within the hollow spider during the operation of molding the composition material around the same and also that gases may seep between the abutting flanges of the upper and lower spider sections into passageways 19 and 20. It can be seen that the gases will flow through the hub passageway 20 into the registering passageway 32 formed in the plug 28 and then to the atmosphere through the passageways 33, 34 and 35. These passageways are not obstructed in any way, shape or manner, and it is obvious that the gases will not escape between upper and lower spider sections and disturb the homogeneous molded structure while it is being molded about the spider. It is evident that this feature is very important and is advantageous in the art of producing composition steering wheels.

Figure 7:
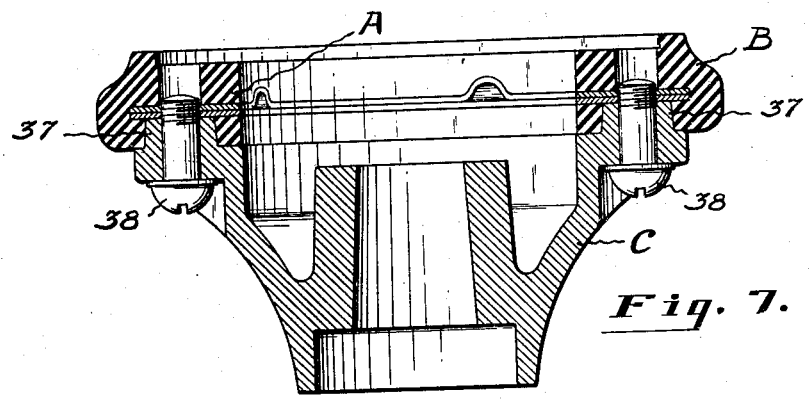
Fig. 7 is an enlarged section of the hub of the wheel taken on the line 7—7 of Fig. 1, showing the separately formed hub member secured to the reinforcing spider.

The separately formed hub C having upwardly projecting lugs 37 on its upper face is assembled to the steering wheel thus formed, with the lugs 37 extending into the openings formed by the enlarged portions of the pins 31, and seating against the hub annulus 11 of the lower spider section. Screws 38 are then inserted through the openings in the lug 37 and threaded into the spider hub annulus as shown in Fig. 7.

Figure 10:
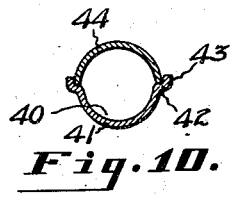
Fig. 10 is a section of a steering wheel spoke showing a modified form of construction.
Figure 11:
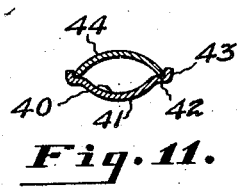
Fig. 11 is a section of a steering wheel rim showing the same modified form of construction shown in Fig. 10.

Figs. 10 and 11 illustrate a slightly modified type of spider construction wherein the edges defining a depression 40 in the spokes and rim of the lower spider section 41 are formed with horizontal portions 42 which terminate in the upwardly extending flanges 43. The spokes and rim of the upper spider section 44 are semi-circular in form, and the marginal edges thereof seat against the horizontal and vertical portions 42 and 43 of the lower spider section 41 and are preferably welded to the same.

It is evident from the drawings and foregoing description that a steering wheel is provided which is light in weight because of the hollow spider, and superior in construction due to the grooving and flanging of the spider sections, and also which can be economically manufactured because of the small area of composition material required as compared with structures used heretofore. It is also evident that the construction of the present invention overcomes the disadvantages of the prior constructions previously described.

It is to be understood, however, that the particular shapes and sections of the reinforcing spider, separately formed hub and steering wheel, have been shown for the purpose of explanation and illustration only, and that formal changes may be made in the specific embodiment of the invention described without departing from the spirit and substance of the broad invention, the scope of which is commensurate with the appended claims.

What I claim is:

1. A steering wheel comprising a metallic reinforcing spider having rim, spoke and hub portions provided with a central hub opening, a continuous passageway in said rim portion, longitudinal passageways in said spokes continuous with said rim passageway and terminating at said hub opening, and a composition body molded around said spider to embed the same, whereby gases created in said passageways durng the process of molding said composition body may be exhausted therefrom at said hub opening.

2. In a composition steering wheel, component rim, spoke and hub sections having aligned central openings, a circumferential groove in the rim of one of said sections, longitudinal grooves in the spokes of the same section continuous with said rim grooves and extending across the body of said hub portion to the central opening thereof, a composition body molded around said sections to embed the same, said grooves providing a passageway for the escape of gases formed therein during the process of molding said composition body, and a hub member secured to said sections.

3. A composition steering wheel comprising component rim, spoke and hub sections having aligned central openings, circumferential grooves formed in the rim thereof, longitudinal groves formed in the spokes of said sections continuous with said rim grooves, said spoke grooves in at least one of said sections being extended across the hub portion to the central opening thereof, and a composition body molded around said sections, said grooves thereby providing a passageway for the escape of gases formed therein during the molding of said composition body around said sections.

4. A composition steering wheel comprising pressed metal component rim, spoke and hub sections secured together face to face, flanges formed integral with the marginal edges of the spokes of one of said sections, a flange formed integral with the inner marginal edges of the rim of the same section continuous with the flanges of said spokes against which the marginal edges of the other section abut, inwardly presenting grooves in the rims of said sections, inwardly presenting longitudinal grooves in the spokes of said sections continuous with said rim grooves, said spoke grooves in at least one of said sections being extended across the hub portion thereof to the central opening therein, and a composition body molded around said section, whereby gases formed in the passageways during the molding of the composition body may be exhausted therefrom to the atmosphere at the hub opening.

5. A steering wheel comprising a pair of single piece hub, spoke and rim sections secured together in abutting relationship and having a central hub opening, continuous passageways in one of said sections facing the other of said sections and extending circumferentially of the rim and longitudinally of the spokes thereof and opening into the central hub opening, and a composition body molded around said sections, said passageways thereby providing means for the escape of gases formed therein during the molding of the composition body.

In testimony whereof I affix my signature.

HARRY A. HUSTED.